Aug. 11, 1953     W. W. EITEL, JR     2,648,776
OPTICAL SYSTEM FOR IMAGE INTENSIFIERS
Filed March 22, 1951     2 Sheets-Sheet 1

WITNESSES:
E. A. M?Closkey.
Wm. C. Groome

INVENTOR
William W. Eitel, Jr.
BY F. W. Lyle.
ATTORNEY

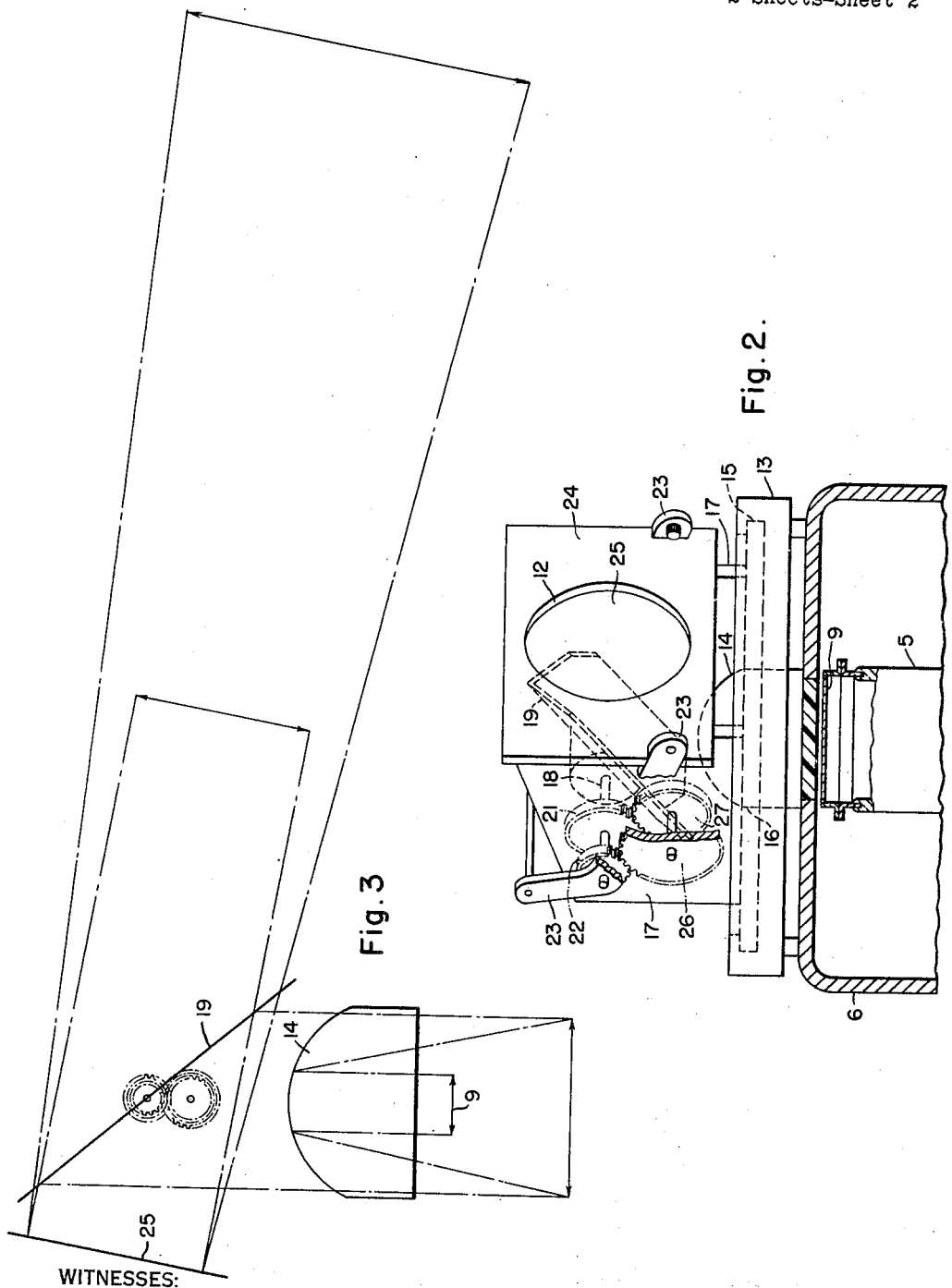

Patented Aug. 11, 1953

2,648,776

UNITED STATES PATENT OFFICE 2,648,776

OPTICAL SYSTEM FOR IMAGE INTENSIFIERS

William W. Eitel, Jr., Baltimore, Md., assignor to Westinghouse Electric Corporation, East Pittsburgh, Pa., a corporation of Pennsylvania Application March 22, 1951, Serial No. 216,965

20 Claims. (Cl. 250—77)

My invention relates to X-ray apparatus and, in particular, relates to X-ray apparatus embodying an electronic image intensifier of the type described and claimed in Mason and Coltman Patent 2,523,132, issued September 19, 1950, for an Image Intensifier and assigned to the assignee of this present application. More specifically, my invention comprises an optical system for producing a magnified view of the image appearing on the output screen of an intensifier of the type disclosed in the above-mentioned patent.

As is more fully described in Longini and Hunter application Serial No. 771,112 for an Image Intensifier, filed August 28, 1947, now Patent #2,555,545, and assigned to the assignee of this application, a very great increase in brightness intensification of the image can be produced in an electronic intensifier by producing on the output screen of an intensifier tube such as is shown in the above-mentioned patent an image having dimensions considerably smaller than those of its input fluorescent screen, and then magnifying this image by a suitable light-optical system. The light-image produced on the output screen of the tube shown in the above-mentioned patent is a reversed and inverted replica of that which the operator would normally see on the fluorescent screen of an X-ray apparatus. My present invention is an optical system which re-inverts and reverses the image on the output screen so that the observer will see the picture of the patient or object under X-ray examination in its true position, while at the same time it is magnified to any desired size and greatly intensified in brightness.

The output screen of the image intensifier of the above-mentioned patent is positioned in the direct path of the X-rays which have been used to irradiate the patient and its fluorescent input screen. My optical system likewise has the valuable property of producing an image which is viewed from a point at one side of the line of this X-ray stream so that an observer employing the apparatus for repeated or successive observations of different patients is not exposed to repeated dosages of X-rays, but is in a safe and remote position. The observer's position is likewise such that he is within easy reach of the patient and so can manually palpate the latter and adjust his positions during observation, a practice which is found highly desirable by roentgenologists.

Even were it safe for the observer to expose himself to the X-ray stream, the position of the output screen of the image intensifier shown in the above-mentioned patent would likewise be such that observation of it would be difficult or impossible in many positions in which the table supporting the patient has to be turned in making observations generally. My optical system has the further advantage that the position of the patient may be changed through wide ranges while the observer remains stationary and has the image presented to his view without altering his own position. My optical system has the further advantage of being readily adjustable to accommodate observers of different heights, or who may wish to take different positions relative to the patient and intensifier.

An application Serial No. 38,586 of Richard L. Longini, filed July 14, 1948, for an Optical System for X-ray Screen Image Intensifiers, assigned to my present assignee, describes and claims an optical system having some of the objects which my present system is designed to accomplish. However, my system is an improvement and in some respects an alternative to that described in the Longini application.

One object of my invention is accordingly to provide an improved form of optical system for use with electronic image intensifiers for X-ray views.

Another object of my invention is to provide an improved type of X-ray system to be used in observations made by X-rays of extremely high penetrating power.

Another object of my invention is to provide an improved form of X-ray system which may be readily adjusted to enable observers of different heights to easily view the fluorescent output screen of an X-ray apparatus.

Still another object of my invention is to provide an arrangement which can be adjusted to enable observers to view the fluorescent screen of an X-ray apparatus from widely different positions outside the stream-line of the X-ray beam.

Still another object of my invention is to provide an improved optical system for furnishing a magnified, reversed and inverted view of the image on the output screen of an electron image intensifier of the type described in Mason and Coltman Patent 2,523,132.

A still further object of my invention is to provide an optical system to be used in combination with an electronic image intensifier which produces a reversed and inverted image on its output screen.

Another object of my invention is to provide an optical system making possible binocular vision for an image intensifier of the type mentioned in the preceding paragraph.

Still another object of my invention is to produce an optical system for effecting certain of the purposes of that shown in Longini application Serial No. 38,586, filed July 14, 1948, but which is much simpler and more economical to manufacture, and in its general construction and mounting.

Other objects of my invention will become apparent upon reading the following description taken in connection with the drawing, in which:

Fig. 2 is a general prospective view of an image intensifier of the type shown in Mason and Coltman Patent 2,523,132 provided with an optical system embodying the principles of my invention; and Fig. 3 is a schematic diagram showing the positions of the components of my optical system and of the images which it produces.

Figure 1:
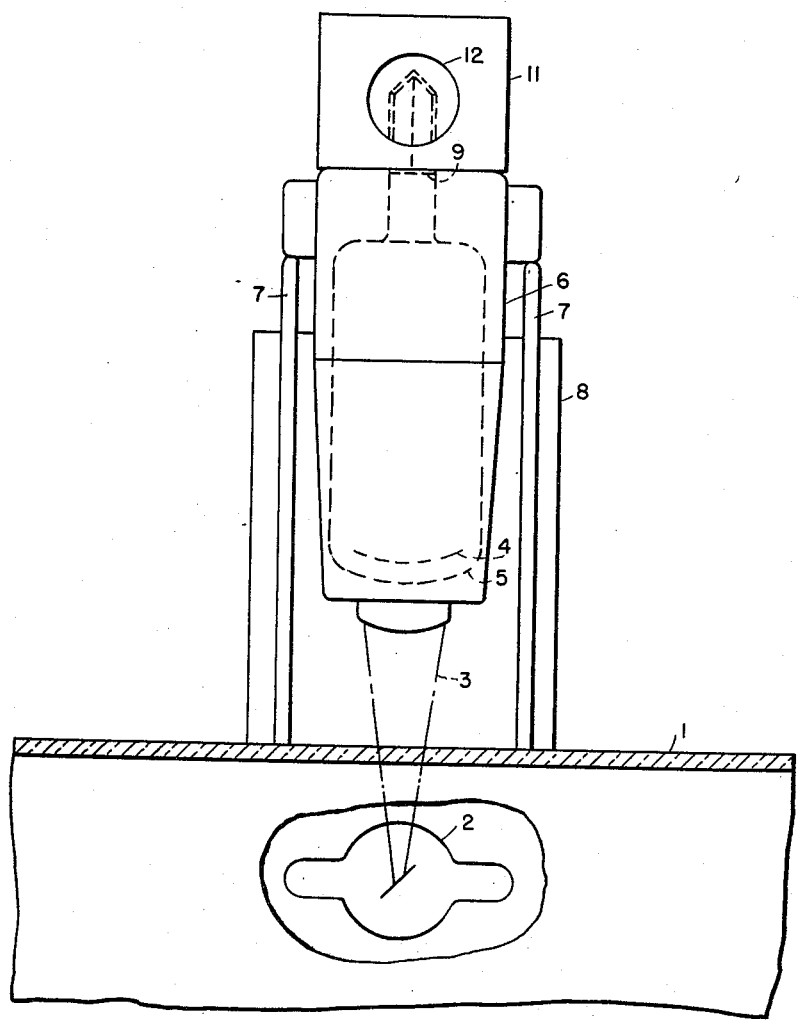
Figure 1 is a general view of an X-ray table supporting an image intensifier and optical system in accordance with my invention.

Referring in detail to Fig. 1 of the drawings, an X-ray table 1 on which a patient to be observed reclines has beneath its level upper surface an X-ray tube 2 of conventional type producing a beam of X-rays 3 which strikes a fluorescent layer 4 on the inner end surface of an image intensifier tube 5 of the type described and claimed in the above-mentioned Mason and Coltman patent and the above-mentioned Longini and Hunter application. The image intensifier tube 5 is supported in a housing 6 which, in turn, is held on a pair of curved bracket arms 7 from a pedestal 8 attached to the X-ray table 1. The table 1 may be arranged in ways well known in the X-ray art so that it can be tilted at any desired angle to the horizontal, the pedestal 8 and the elements so far mentioned moving with it. The X-ray tube and other elements so far mentioned may likewise be provided with supports so that they can be moved either laterally or longitudinally of the table 1 to observe different portions of the patient's body.

The light image produced by the X-rays on the fluorescent screen 4 generates an electron image corresponding in intensity to it point by point on a photo-electric surface closely adjacent to the fluorescent screen inside the tube 5, and this electron image is accelerated and contracted so that it impinges on an electron phosphor output screen 9 at the opposite end of the tube 5. As is more fully described in the above-mentioned Mason and Coltman patent and Hunter and Longini application, the electrons thus produce on the output screen 9 a light image which is a replica, except for contracted dimensions and greatly increased brightness, of the light image produced on the fluorescent screen 4.

In accordance with my invention, I support above the output screen 9 in housing 11 an optical system of the type disclosed in more detail in Figs. 2 and 3. The observer who wishes to view the X-ray image looks into the lens at the window 12 in the housing 11 where he sees a virtual image of high intensity, and any degree of magnification desired of the view appearing on the phosphor input screen 4.

Turning in detail to Fig. 2, the housing 6 has a flat upper end having an opening in which the electron phosphor output screen 9 is positioned. Supported on this flat end of housing 6 is a circular base plate 13 having an opening aligned with the screen 9 and an aplanatic lens 14 positioned thereon to magnify the light image appearing on the screen 9. The base plate 13 has an annular recess in its upper surface in which is slidably positioned an annular plate 15 having a central opening 16 through which the lens 14 projects. On the plate 15 are two upright side plates 17 having bearings for a horizontal shaft 18. Supported on the shaft 18 substantially midway between the side plate 17 is a device which may be referred to as a roof-mirror 19 comprising a pair of flat plates at right angles to each other and somewhat resembling the pitch-roof of a house. The inner surfaces of these two plates are made highly reflective by any means well known in the art so that they are good mirrors. The side plates of the roof-mirror 19 are so attached to the shaft 18 that the plane bisecting the angle between the mirrors is normal to the axis of shaft 18. The shaft 18 normally occupies such a position that the line of intersection of the two roof-mirrors is approximately at 45° to the horizon, although as will be explained below, this angle is adjustable through a moderate amount.

The shaft 18 is provided with a pair of spur gears 21 and 22, of which 21 is connected to the shaft 18 and so is integrally connected to the roof-mirror 19. On the other hand, the spur gear 22 is loose on the shaft 18 but is connected by a pair of arms 23 (broken away in Fig. 2 to allow the gears 21 and 22 to show more plainly) to lens-plate 24 which normally stands substantially vertical and contains the window 12 already mentioned and described in Fig. 1. The lens-plate 24 is positioned far enough in front of the edges of the side plates 17 so that it can swing on its support arms 23 through a moderate angle about the shaft 18 moving the spur gear 22 with it, of course. The window 12 supports a lens 25 which further magnifies the view seen by the observer who looks into it.

Meshing with the gears 21 and 22 are two other gears 26 and 27 which are connected together to an idler shaft which is journalled in one of the end plates 17. A moment's consideration will show that when the lens-plate 24 is turned about its axis on the shaft 18, the gear train comprising the four members 21, 22, 26 and 27 impart a turning movement in the same direction about shaft 18 to the roof-mirror 19. The gear ratios are made such that the angular movement about the shaft 18 of roof-mirror 19 is one-half that of the lens-plate 24 about the same center. Since the beam reflected by the mirror from any fixed source turns through twice any angle through which the mirror is turned, it will be seen that by this arrangement the beam reflected through the lens 25 as the roof-mirror 19 and lens-plate 24 are turned about shaft 18 is always maintained in alignment with the optical axis of the lens 25.

It will be seen that with the above-described arrangement, the lens 25 can be moved about the shaft 18 to a point above the horizontal to accommodate a tall observer and below the horizontal to accommodate a short observer when the table 1 is in its horizontal position. On the other hand, when the table 1 is placed in a vertical position, the shaft 18 will likewise be vertical and the lens 25 will turn about it by movement in a horizontal direction. This permits the observer to change his position in a lateral direction and adjust the optical system to maintain an easy view of the image of the patent.

The optical properties of the mirrors and lenses thus described are such that the observer looking into the lens 25 sees a reversed and inverted picture of the image generated by the incident electrons on the output screen 9 of the image intensifier tube 5. Since, as has been previously stated, the latter image is itself a reversed and inverted picture of the image produced by the X-rays on the input screen 4, it will be seen that the observer looking through the lens 25 sees the image produced by the X-rays on the fluorescent input screen in its true position. However, as has previously been stated, this image has been magnified by the lenses 14 and 25 to any desired degree and is many times brighter than that appearing on the input screen 4.

It has already been stated that the plate 15 is seated in the recess in stationary plate 13 in such a way that it can be turned about the vertical axis of the image intensifier tube 5. When the table top is horizontal, this permits the observer to take any desired position relative to the head and feet of the patient, turning the entire optical system supported on the plate 15 about the central axis of the tube 5 so that the axes of the lens 25 reach his eyes.

When, on the other hand, the table 1 is turned to a vertical position, rotation of the plate 15 about the said axis permits the optical axis of the lens 25 to be tilted upward or downward as necessary to accommodate a tall or short observer. Suitable binding means are provided to clamp the lens-plate 24 in any desired angular position about the shaft 18 and to clamp the base plate 15 in any desired position relative to the support plate 13.

The schematic diagram of Fig. 3 is provided to show the relative positions of the output screen 9, the lenses 14 and 25, and the roof-mirror 19, and also the virtual image seen by the eye of the observer looking along the optical axis of the lens 25. The large exit pupil of the optical system permits the observer to see the picture in the mirror 19 with both eyes. All the lenses have a low-reflecting coating of a type well known in the optical art. The light efficiency of this system is very high inasmuch as the light is transmitted through only two lenses and from a reflector which can be given an extremely high reflecting power.

I claim as my invention:

1. In combination with a source of X-rays, an image intensifier tube comprising a fluorescent screen and an electron optical system energized by light from said screen and projecting an electron image of the light-field of said screen to produce a reversed and inverted light-image on an output screen, an optical system comprising a pair of plates intersecting each other substantially at right angles and reflecting on their adjacent faces, a magnifying lens system, and means for supporting said plates and said lenses in position to project an image of said output screen to one side of the axis along which said X-rays are projected.

2. In combination with an image intensifier tube comprising a fluorescent screen and an electron optical system energized by light from said screen and projecting an electron image of the light-field of said screen to produce a reversed and inverted light-image on an output screen, an optical system comprising a pair of plates intersecting each other substantially at right angles and reflecting on their adjacent faces, a magnifying lens system, and means for supporting said plates and said lenses in position to project an image of said output screen to one side of the axis along which said electron image is projected.

3. In combination with a source of X-rays, an image intensifier tube comprising a fluorescent screen and an electron optical system energized by light from said screen and projecting an electron image of the light-field of said screen to produce a contracted reversed and inverted light image on an output screen, an optical system comprising a pair of plates intersecting each other substantially at right angles and reflecting on their adjacent faces, a magnifying lens system, means for supporting said plates and said lenses in position to project an image of said output screen to one side of the axis along which said X-ray image is projected, and means for adjustably clamping said lens system to fix the angle of the rays reflected by said mirror relative to the axis of projection of said X-rays.

4. In combination with an image intensifier tube comprising a fluorescent screen and an electron optical system energized by light from said screen and projecting an electron image of the light-field of said screen to produce a contracted reversed and inverted light image on an output screen, an optical system comprising a pair of plates intersecting each other substantially at right angles and reflecting on their adjacent faces, a magnifying lens system, means for supporting said plates and said lenses in position to project an image of said output screen to one side of the axis along which said electron image is projected, and means for adjustably clamping said lens system to fix the angle of the rays reflected by said mirror relative to the axis of projection of said electron image.

5. In combination with a source of X-rays, an image intensifier tube comprising a fluorescent screen and an electron optical system energized by light from said screen and projecting an electron image of the light-field of said screen to produce a contracted reversed and inverted light-image on an output screen, a roof-mirror, means for supporting said roof-mirror with the plane bisecting the angle between its reflecting surfaces containing the optical axis of said electron optical system, a magnifying lens, means for supporting said magnifying lens so that its optical axis lies in said plane, and means for turning the axis of said magnifying lens about an axis normal to said plane.

6. In combination with a source of X-rays producing a light-image on a fluorescent screen, an optical system comprising a pair of plates intersecting each other substantially at right angles and reflecting on their adjacent faces, a magnifying lens system, means for supporting said plates and said lenses in position to project an image of said screen to one side of the axis along which said X-rays are projected, and means for adjustably clamping said lens system to fix the angle of the rays reflected by said mirror relative to the axis of projection of said electron image.

7. In combination with a source of X-rays, an image intensifier tube comprising a fluorescent screen and an electron optical system energized by light from said screen, a roof-mirror, means for supporting said roof-mirror with the plane which bisects the dihedral angle between its mirror-surfaces containing the optical axis of said electron optical system, a magnifying lens, means for supporting said magnifying lens so that its optical axis lies in said plane, means for turning the axis of said magnifying lens about an axis normal to said plane, and means for turning said roof mirror about said normal axis through an angle always one-half as great as that through which the axis of said magnifying lens is turned.

8. In combination with a source of X-rays, producing a light-image on a fluorescent screen, a magnifying lens, a roof-mirror, means for supporting said roof-mirror with the plane which bisects the dihedral angle between its mirror-surfaces containing the optical axis of said magnifying lens, means for turning the axis of said magnifying lens about an axis normal to said plane, and means for turning said roof mirror about said normal axis through an angle always one-half as great as that through which the axis of said magnifying lens is turned.

9. In combination with a source of X-rays, producing a light-image on a fluorescent screen, a magnifying lens, a roof-mirror, means for supporting said roof-mirror with the plane which bisects the dihedral angle between its mirror-surfaces containing the optical axis of said magnifying lens, means for turning the axis of said magnifying lens about an axis normal to said plane, and means for turning said roof mirror about said normal axis through an angle always one-half as great as that through which the axis of said magnifying lens is turned and clamping its position relative to said fluorescent screen.

10. In combination with a source of X-rays, an image intensifier tube comprising a fluorescent screen and an electron optical system energized by light from said screen, a roof-mirror, means for supporting said roof-mirror with the plane which bisects its dihedral angle containing the optical axis of said electron optical system, a magnifying lens, means for supporting said magnifying lens so that its optical axis lies in said plane and intersects the common point of the ridge-line of said roof-mirror and the axis of said electron optical system, means for turning said ridge-line and the axis of said magnifying lens about a normal axis to said dihedral plane which passes through said intersection point, and means for turning said roof-mirror about said normal axis through an angle always one-half as great as that through which the axis of said magnifying lens is turned about said normal axis, means being provided for clamping said magnifying lens in fixed relation relative to said support means.

11. In combination with a source of X-rays, an image intensifier tube having a fluorescent screen at one end on which X-rays from said source impinge, a photo-electric layer positioned so that light from said fluorescent screen generates an electron image, means for projecting said electron image into incidence with an electron-phosphor screen, the last said image having dimensions smaller than those on said fluorescent screen, means for supporting said image intensifier tube with the direction along which said electron image is projected aligned with the direction of propagation of said X-rays, a base plate having an opening supported in a plane substantially normal to the aforesaid direction, a member supported on said base plate for rotation about said direction as an axis, a roof-mirror supported on said member on an axle which intersects said axis at right angles, the plane bisecting the dihedral angle between the reflecting surfaces of said roof-mirror also containing said axis, a magnifying lens having an optical axis lying in said plane and passing through said axle means for supporting said magnifying lens for rotational movement about said axle, and mechanism interconnecting said magnifying lens and said roof-mirror to ensure that angular movement of said magnifying lens about said axle relative to said bearing plate is twice as great as angular movement of said roof-mirror relative to said bearing plate.

12. In combination with an image intensifier tube having a fluorescent screen at one end, a photo-electric layer positioned so that light from said fluorescent screen generates an electron image, means for projecting said electron image into incidence with an electron-phosphor screen, the last said image having dimensions smaller than those on said fluorescent screen, means for supporting said image intensifier tube with the direction along which said electron image is projected aligned with the direction of propagation of said X-rays, a base plate having an opening supported in a plane substantially normal to the aforesaid direction, a member supported on said base plate for rotation about said direction as an axis, a roof-mirror supported on said member on an axle which intersects said axis at right angles, the plane bisecting the dihedral angle between the reflecting surfaces of said roof-mirror also containing said axis, a magnifying lens having an optical axis lying in said plane and passing through said axle, means for supporting said magnifying lens for rotational movement about said axle, and mechanism interconnecting said magnifying lens and said roof-mirror to ensure that angular movement of said magnifying lens about said axle relative to said bearing plate is twice as great as angular movement of said roof-mirror relative to said bearing plate.

13. In combination with a source of X-rays, a fluorescent screen irradiated by X-rays from said source, a base plate having an opening supported in a plane substantially normal to the projection direction of said X-rays, a member supported on said base plate for rotation about said direction as an axis, a roof-mirror supported on said member on an axle which intersects said axis at right angles, the plane bisecting the dihedral angle between the reflecting surfaces of said roof-mirror also containing said axis, a magnifying lens having an optical axis lying in said plane and passing through said axle, means for supporting said magnifying lens for rotational movement about said axle, and mechanism interconnecting said magnifying lens and said roof-mirror to ensure that angular movement of said magnifying lens about said axle relative to said bearing plate is twice as great as angular movement of said roof-mirror relative to said bearing plate.

14. In combination with a source of X-rays, an image intensifier tube having a fluorescent screen at one end, a photo-electric layer positioned so that light from said fluorescent screen generates an electron image, means for projecting said electron image into incidence with an electron phosphor screen, the last said image having dimensions smaller than those on said fluorescent screen, means for supporting said image intensifier tube with the direction along which said electron image is projected aligned with the direction of propagation of said X-rays, a base plate having an opening supported in a plane substantially normal to the aforesaid direction, a member supported on said base plate for rotation about said axis, a roof-mirror supported on an axle on said member in a position intersecting said axis at right angles, the ridge of said roof-mirror intersecting said axis and the plane bisecting the dihedral angle between the reflecting surfaces of said roof-mirror also containing said axis, a magnifying lens having an optical axis lying in said plane and passing through said axle, a first spur gear fastened to said axle, a second spur gear supported on said axle but free to rotate relative thereto, means for supporting said magnifying lens in a fixed position relative to said second spur gear, an idler shaft journalled in said support and a pair of spur gears on said idler shaft respectively meshing with said first spur gear and said second spur gear, the ratio of said gears being such that angular movements of said magnifying lens relative to said support means are twice any angular movements of said roof-mirror relative to said support means.

15. In combination with a source of X-rays, an image intensifier tube having a fluorescent screen at one end, a photo-electric layer positioned so that light from said fluorescent screen generates an electron image, means for projecting said electron image into incidence with an electron phosphor screen, the last said image having dimensions smaller than those on said fluorescent screen, means for supporting said image intensifier tube with the direction along which said electron image is projected aligned with the direction of propagation of said X-rays, a base plate having an opening supported in a plane substantially normal to the aforesaid direction, an aplanatic magnifying lens supported adjacent said base plate with its axis coincident to the direction of projection of said electron image, a member supported on said base plate for rotation about said axis, a roof-mirror supported on said member on an axle which is normal to the plane bisecting the dihedral angle between the reflecting surfaces of said roof-mirror, a magnifying lens having an optical axis lying in said plane and passing through said axle, means for supporting said magnifying lens for rotational movement about said axle, and mechanism interconnecting said magnifying lens and said roof-mirror to ensure that angular movement of said magnifying lens about said axle relative to said bearing plate is twice as great as angular movement of said roof-mirror relative to said bearing plate.

16. In combination with a source of X-rays, an image intensifier tube having a fluorescent screen at one end, a photo-electric layer positioned so that light from said fluorescent screen generates an electron image, means for projecting said electron image into incidence with an electron phosphor screen, the last said image having dimensions smaller than those on said fluorescent screen, means for supporting said image intensifier tube with the direction along which said electron image is projected aligned with the direction of propagation of said X-rays, a base plate having an opening supported in a plane substantially normal to the aforesaid direction, an aplanatic magnifying lens supported adjacent said base plate with its axis coincident the direction of projection of said electron image, a member supported on said base plate for rotation about said axis, a roof-mirror supported on an axle on said member in a position intersecting said axis at right angles, the ridge of said roof-mirror intersecting said axis and the plane bisecting the dihedral angle between the reflecting surfaces of said roof-mirror also containing said axis, a magnifying lens having an optical axis lying in said plane and passing through said axle, a first spur gear fastened to said axle, a second spur gear supported on said axle but free to rotate relative thereto, means for supporting said magnifying lens in a fixed position relative to said second spur gear, an idler shaft journalled in said support and a pair of spur gears on said idler shaft respectively meshing with said first spur gear and said second spur gear, the ratio of said gears being such that angular movements of said magnifying lens relative to said support means are twice any angular movements of said roof-mirror relative to said support means.

17. In combination with an image intensifier tube comprising a fluorescent screen and an electron optical system energized by light from said screen and projecting an electron image of the light-field of said screen to produce a contracted reversed and inverted light-image on an output screen, a roof-mirror, means for supporting said roof-mirror with the plane bisecting the angle between its reflecting surfaces containing the optical axis of said electron optical system, a magnifying lens, means for supporting said magnifying lens so that its optical axis lies in said plane, and means for turning the axis of said magnifying lens about an axis normal to said plane.

18. In combination with an image intensifier tube comprising a fluorescent screen and an electron optical system energized by light from said screen, a roof-mirror, means for supporting said roof-mirror with the plane which bisects its dihedral angle containing the optical axis of said electron optical system, a magnifying lens, means for supporting said magnifying lens so that its optical axis lies in said plane and intersects the common point of the ridge-line of said roof-mirror and the axis of said electron optical system, means for turning said ridge-line and the axis of said magnifying lens about a normal axis to said dihedral plane which passes through said intersection point, and means for turning said roof-mirror about said normal axis through an angle always one-half as great as that through which the axis of said magnifying lens is turned about said normal axis, means being provided for clamping said magnifying lens in fixed relation relative to said support means.

19. In combination with an image intensifier tube having a fluorescent screen at one end, a photoelectric layer positioned so that light from said fluorescent screen generates an electron image, means for projecting said electron image into incidence with an electron phosphor screen, means for supporting said image intensifier tube with the direction along which said electron image is projected aligned with the direction of propagation of said X-rays, a base plate having an opening supported in a plane substantially normal to the aforesaid direction, an aplanatic magnifying lens supported adjacent said base plate with its axis coincident the direction of projection of said electron image, a member supported on said base plate for rotation about said axis, a roof-mirror supported on an axle on said member in a position intersecting said axis at right angles, the ridge of said roof-mirror intersecting said axis and the plane bisecting the dihedral angle between the reflecting surfaces of said roof-mirror also containing said axis, a magnifying lens having an optical axis lying in said plane and passing through said axle, a first spur gear fastened to said axle, a second spur gear supported on said axle but free to rotate relative thereto, means for supporting said magnifying lens in a fixed position relative to said second spur gear, an idler shaft journaled in said support and a pair of spur gears on said idler shaft respectively meshing with said first spur gear and said second spur gear, the ratio of said gears being such that angular movements of said magnifying lens relative to said support means are twice any angular movements of said roof-mirror relative to said support means.

20. In combination with a source of X-rays, an image intensifier tube comprising a fluorescent screen and an electron optical system energized by light from said screen and projecting an electron image of the light-field of said screen to produce a reversed and inverted light-image on an output screen, an optical system comprising a pair of plates intersecting each other and reflecting on their adjacent faces, a magnifying lens system, and means for supporting said plates and said lenses in position to project an image of said output screen to one side of and rotatably about the axis along which said X-rays are projected.

WILLIAM W. EITEL, Jr.

References Cited in the file of this patent

UNITED STATES PATENTS

| Number | Name | Date |
|---|---|---|
| 2,093,288 | Ogloblinsky | Sept. 14, 1937 |
| 2,158,853 | Coolidge | May 16, 1939 |
| 2,363,600 | Lawlor | Nov. 28, 1944 |
| 2,401,191 | Rosett | May 28, 1946 |
| 2,523,132 | Mason et al. | Sept. 19, 1950 |
| 2,555,423 | Sheldon | June 5, 1951 |
| 2,555,545 | Hunter et al. | June 5, 1951 |